United States Patent [19]

Shutt

[11] 4,030,353
[45] June 21, 1977

[54] EFFORT LIMITING AND INTERRUPTING ACTUATOR

[75] Inventor: Donald P. Shutt, Long Beach, Calif.

[73] Assignee: Western Gear Corporation, Lynwood, Calif.

[22] Filed: Apr. 12, 1976

[21] Appl. No.: 676,337

Related U.S. Application Data

[63] Continuation-in-part of Ser. No. 554,509, March 3, 1975, Pat. No. 3,964,318.

[52] U.S. Cl. .............................. 73/139; 212/39 R
[51] Int. Cl.² .................................... B66C 13/50
[58] Field of Search .......... 73/139; 212/39 R, 39 B, 212/39 DB, 39 MS, 39 A; 81/52.5; 173/12, 20

[56] References Cited

UNITED STATES PATENTS

| 2,557,695 | 6/1951 | Savoy | 73/139 |
|---|---|---|---|
| 2,877,645 | 3/1959 | Nealy | 73/139 |
| 3,076,362 | 2/1963 | Able | 73/139 |
| 3,523,471 | 8/1970 | Lance | 81/52.5 |

Primary Examiner—James J. Gill
Assistant Examiner—Anthony V. Ciarlante
Attorney, Agent, or Firm—Forrest J. Lilly

[57] ABSTRACT

The disclosure is of an effort limiting actuator, comprising an arm system which is subject to lateral deflection when subjected to a predetermined force or torque, but which withstands deflection until such force or torque reaches a predetermined magnitude. The arm system is stabilized against exerted force or torque until a pre-compressed helical compression spring incorporated in the device has been compressed sufficiently under said force or torque to overcome the force of pre-compression, at which time the aforementioned deflection occurs. This deflection will be in either of two directions depending upon the direction of the force or torque. Switch means are selectively actuated in response to the direction of the force or torque thereto to interrupt that force or torque, or in other words the initially mentioned effort, which the actuator is intended to limit. The device is operative with the effort exerted in either direction of operation, and is thus directionally discriminative.

6 Claims, 9 Drawing Figures

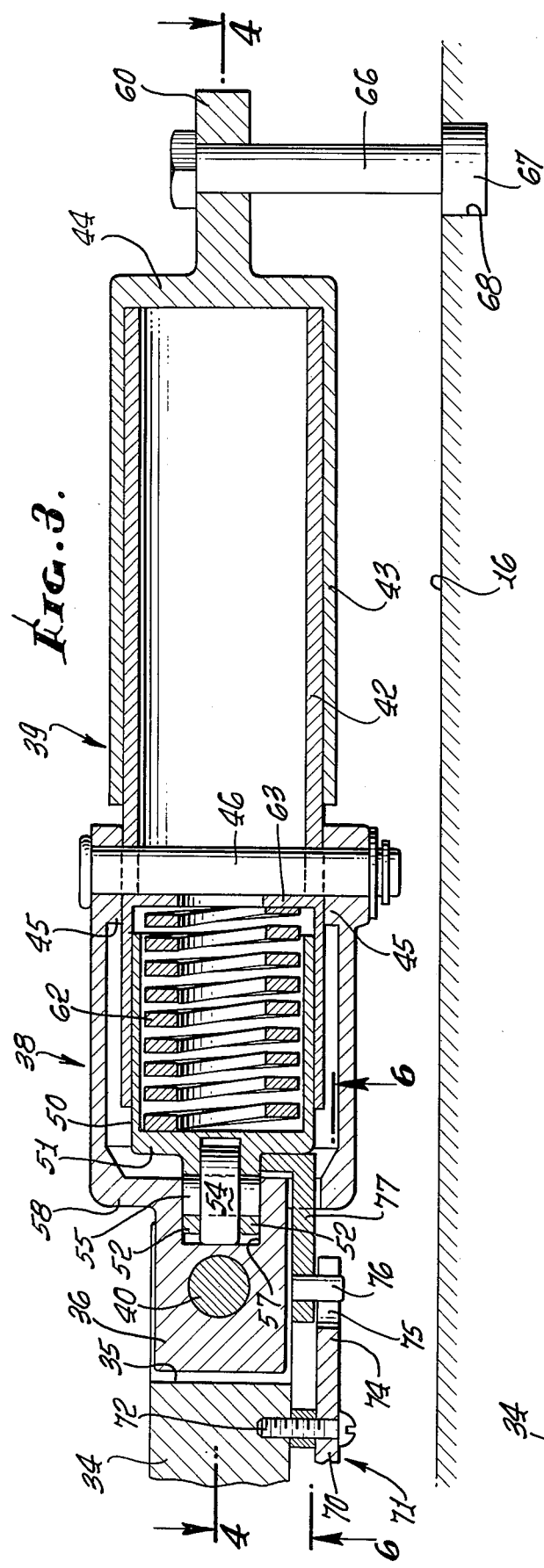
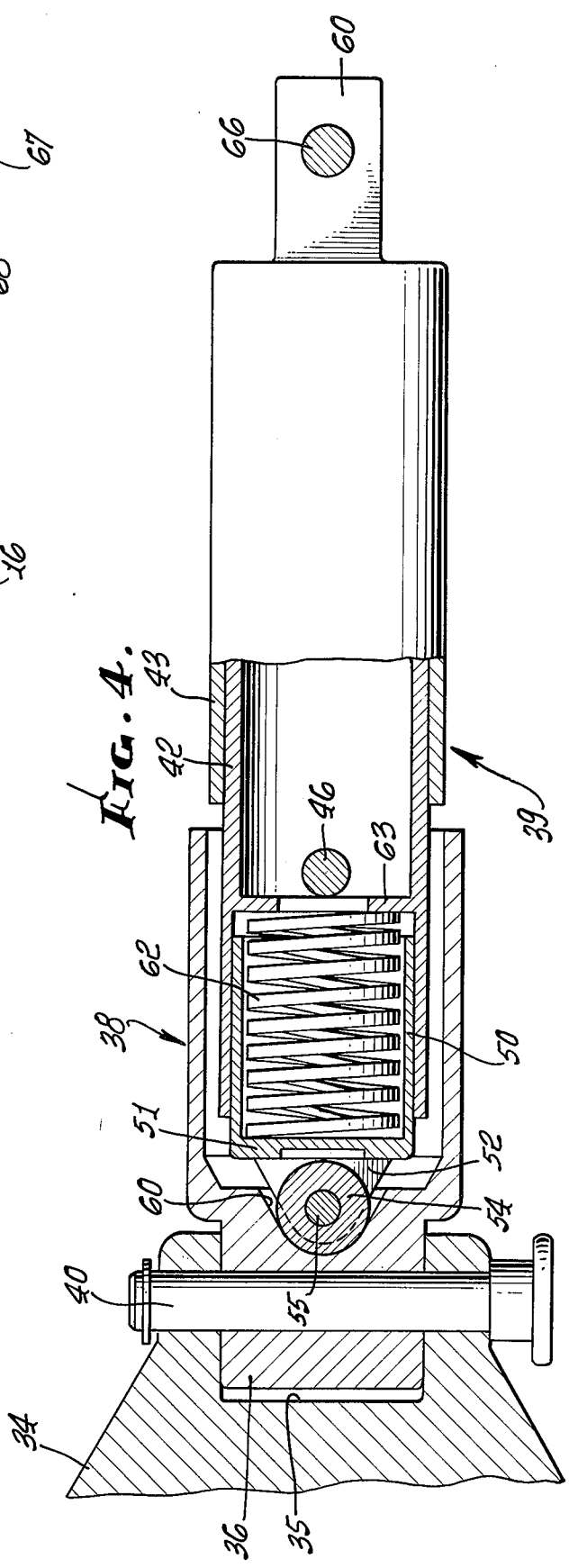

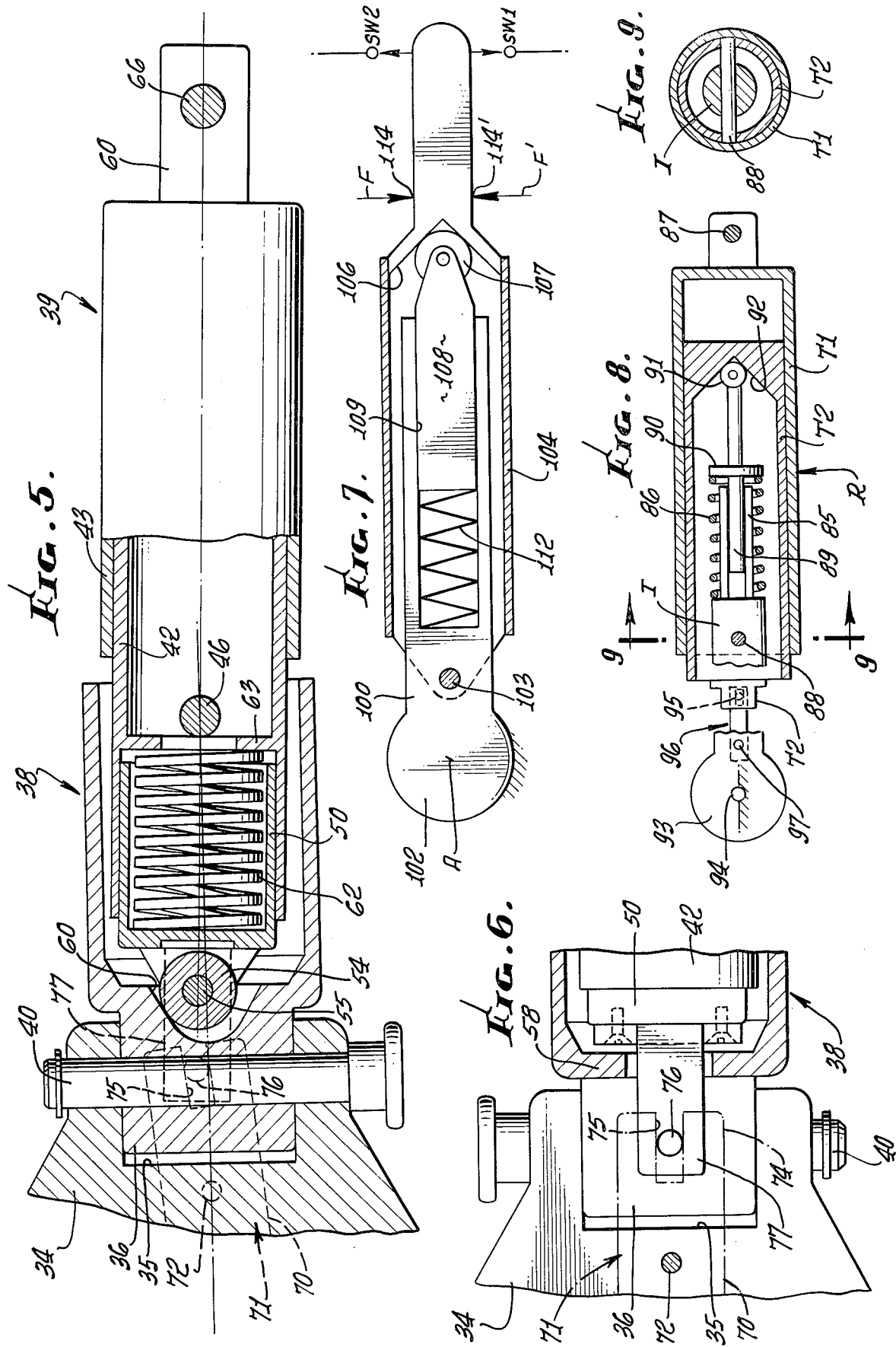

EFFORT LIMITING AND INTERRUPTING ACTUATOR

RELATED APPLICATION

This application is a continuation-in-part of an earlier application entitled DISCONNECT DEVICE FOR AIRCRAFT PITCH OR ROLL CONTROL SYSTEM, Ser. No. 554,509, filed Mar. 3, 1975, and now Pat. No. 3,964,318.

FIELD OF THE INVENTION

This invention deals generally with a device which may be broadly described as a force or torque limiting actuator, and more particularly to such an actuator which is bidirectional in the sense that it delivers a different discriminatory response to oppositely directed torques or forces. The invention is also of a class wherein the discriminatory responses are delivered only as the force or torques attain predetermined magnitudes. Such device may thus function as force or torque limiters, discriminatory as to the direction of force or torque application, and sensitive to applied force or torque only as preselected force or torque magnitudes are attained.

BACKGROUND OF THE INVENTION

In one illustrative application of the invention, in a helicopter personnel rescue hoist, a boom mounted on the upper end portion of a rotatable post or stanchion in a helicopter carries a reel of cable, the free end of which may bear a suspension hook which can be lowered from or elevated back to the free end of the boom. The hook is engageable with a personnel sling. The boom stanchion is swivelled on a vertical axis between the ceiling and floor of a helicopter compartment, and is capable of being rotated, by motor drive, through an angle of substantially 90° between an outwardly projecting rescue position, and an inward unloading position inside the helicopter.

Owing to presence of stanchions or other obstructions, it can sometimes occur that the swinging boom will laterally engage and hang up thereagainst, and it is then desirable to instantly interrupt the drive of the boom by the motor. Steps can then be taken to drive the motor powering the boom in the reverse direction, so that the boom thereupon backs off. It is the primary purpose of the invention to provide a system which will accomplish this operation.

BRIEF DESCRIPTION OF THE INVENTION

Described only briefly at this point, the invention involves a torque or force limiting sensor, comprising an arm system which is subject to deflection under a predetermined force or torque, which may be generated by a drive motor, or otherwise, but which is held against such deflection by a preloaded compression spring, until the predetermined force or torque attains a magnitude at which it overcomes the bias or pre-load force of the spring. The arm system thereupon angularly deflects, and by such action, operates a switch which de-energizes the motor, or whatever other source of effort may be used. The invention has the unique accomplishment that it discriminates between load forces or torques in reverse directions.

BRIEF DESCRIPTION OF THE DRAWINGS

FIG. 3 is a vertical section taken in accordance with the line 3—3 of FIG. 2;

FIG. 4 is a section taken on line 4—4 of FIG. 3 and will be understood to be a longitudinal section looking upwards;

FIG. 5 is a view taken in accordance with line 4—4 of FIG. 3, but showing the device in a torque limiting actuated position.

FIG. 6 is a view in accordance with the section line 6—6 on FIG. 3;

FIG. 7 is a diagrammatic view of a simple modified form of the invention;

FIG. 8 is a diagrammatic view looking downward at a modification of the embodiment of FIGS. 1—6, with equivalent reversal and rearrangement of certain component parts, and with parts broken for clarity of exposition; and FIG. 9 is a transverse section on line 9—9 of FIG. 8.

DETAILED DESCRIPTION OF AN ILLUSTRATIVE EMBODIMENT

Figure 1:
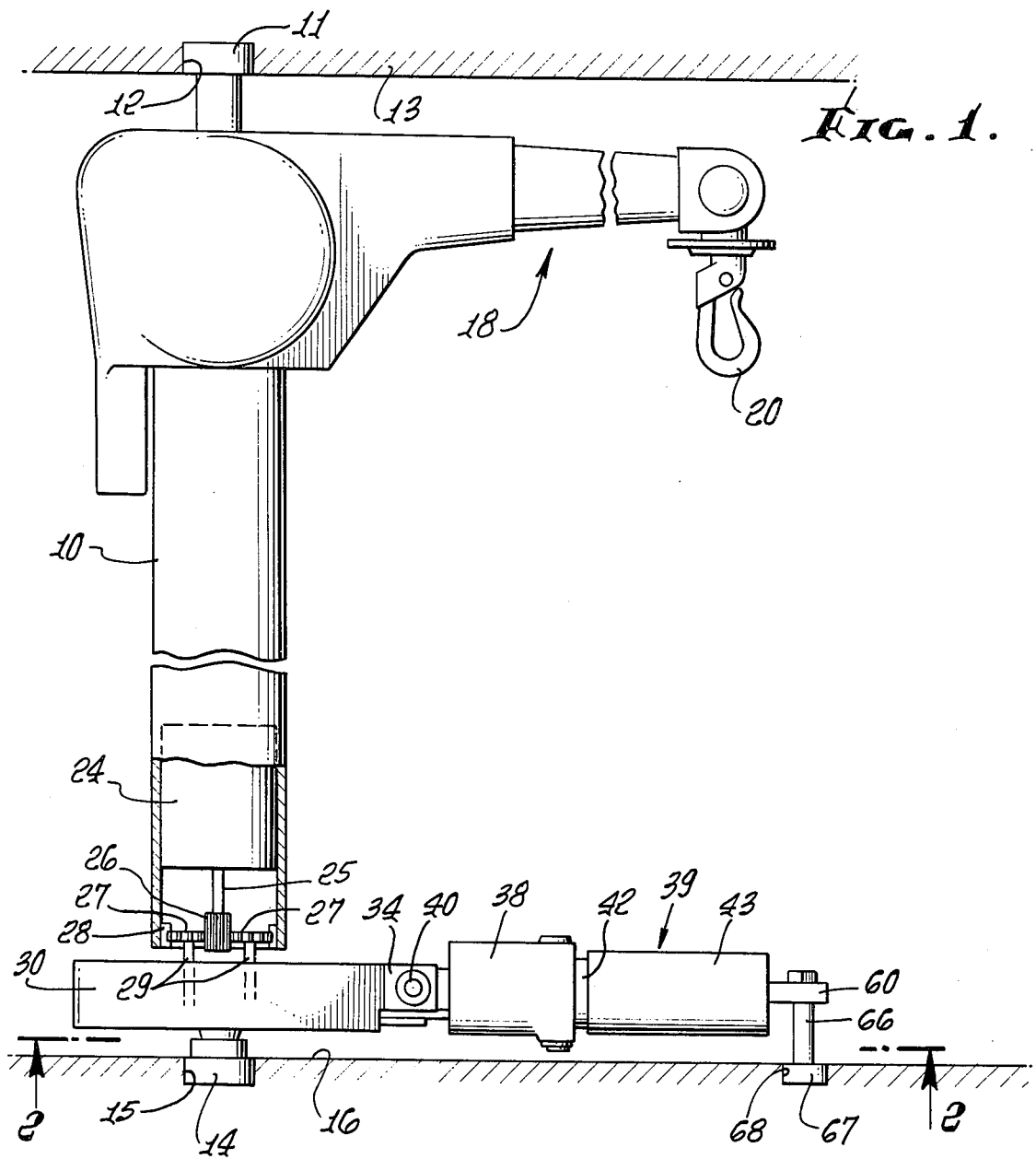
FIG. 1 is a largely diagrammatic side elevational view, with parts broken away to reveal underlying parts in section, of a helicopter rescue device illustrating a practical application of the invention.

Referring now to the drawings, and first to FIGS. 1 and 2, the environment of the invention in a present application will first be described. Reference numeral 10 designates generally a hollow tubular post or stanchion, positioned on and rotatable about a vertical axis. This stanchion may bear at its upper extremity a circular anchor-fitting 11 rotatably received into a socket 12 sunk into the ceiling 13 of a helicopter compartment, its lower extremity being connected and supported, through presently described means, to a coaxial circular anchor-fitting 14 rotatably fitted into a socket 15 sunk into the helicopter compartment floor 16. The upper end of the stanchion 10 carries the inner end of a horizontally projecting boom 18, understood to contain a hoist with a reel of cable, and a sheave at its extremity over which the cable is trained to reach the hook 20. Some of these parts are omitted from the drawings as not pertinent to an understanding of the invention; but enough is shown and described for an understanding of a representative environment or frame of reference for the invention in the selected practical application.

The stanchion 10 and boom 18 will be understood further as mounted just inside a side door of the helicopter compartment or cabin, so that, by turning the stanchion 10, by motor drive, the boom can be swung out of, or back into, the helicopter compartment, for pickup of personnel in the outreaching position, or unloading back inside the compartment. As explained earlier, a primary purpose of the present invention in its present field of use is to provide for stoppage of the swinging helicopter boom upon encountering an interfering obstruction, in either direction of swing of the boom. Limit switches, not a part of the invention, and not shown, may be used to confine the arc of swing of the boom to 90°. Manual off-and-on switch means may also be provided for the motor.

In the present application of the invention, a reversible electric motor 24 is mounted fast on the inside of the hollow stanchion 10, in a position coaxial with the latter. The motor shaft 25 carries a sun gear 26, which in turn meshes with planetary gears 27, and the latter mesh with an internal ring gear 28 tightly mounted on the inside of the hollow stanchion 10. The planetary gears 27 are afforded with a suitable cage, here diagrammatically represented by a pair of posts 29 on which they may rotate, and the latter extend upwardly from a generally circular rotatable base or platform 30, from the center of which extends vertically downward the aforementioned rotatable floor mounting anchor fitting 14.

The circular base 30 has on one side a lateral protuberance 34 with a parallel sided end groove 35 that closely receives a parallel sided tongue 36 at the extremity of a tubular radial arm 38, which may be referred to as an input arm. The protuberance 34 and arm 38 are permanently fixed to one another by a horizontal locking pin 40, and it will be understood that there is no pivotal movement at the pin 40, and that the arm 38 is fixed radially relative to base 30. As a matter of fact, in theory, the arm 38 and platform or base 30 can be treated as one body, the platform comprising the hub of the arm 38, and therefore a part thereof. As shown in FIG. 3, there is receivable inside the tubular arm 38, with annular clearance, excepting at the location of the later mentioned pads 45, one end portion of a tubular arm 39, comprised preferably of two telescoping tube members 42 and 43. The inside member 42 is the one having its one end portion received inside the tube 38. The outside tubular member 43 has an end wall 44. Near this end wall the tube 43 is pivotally anchored, so as to swing about a vertical axis, to the helicopter floor. In this illustrative case, the tube end wall 43 is somewhat diagrammatically shown to carry a lug 60, vertically pierced by a vertical stem 66 which has on its lower end a circular anchoring head 67 received rotatably in a socket 68 set into the helicopter floor.

The tubular arm sleeve 42 is connected by a vertical pivot joint pin 46 to the extremity of the tubular arm 38. The pin 46 goes through flat-surface pads 45 on and just inside the open end of the arm member 38, and through the arm or sleeve member 42. Tubular arm or sleeve member continues on towards the left in FIGS. 3 and 4, at a sufficient radial clearance from tubular arm 38 to accommodate necessary angular swing inside arm 38 on pin 46, and to provide an external tubular guide sleeve and spring housing into which is telescopically received a tubular plunger 50, in this instance in the form of a guide and spring housing sleeve, with an end wall 51. The end wall 51 bears a pair of vertically spaced lugs 52 between which is received a roller 54, mounted for rotation on a vertical pin 55 carried by the lugs 52. The lugs 52, pin 55 and roller 54 are received within a groove or notch 57 sunk into the end of the tubular tongue 36 from inside the end wall 58 of the tubular arm part 38 to key the sleeve 50 from rotation away from its properly oriented position as illustrated in FIG. 3.

The roller is engageable in a round-bottomed V-notch 60 formed in the end of the aforementioned tongue 36. A helical compression spring 62, of preselected stiffness, or spring rate, is confined in the sleeve 50 under a predetermined precompression, or compressive bias, with one end bearing against end wall 51 of sleeve 50, and the other against annular flange or seat 63 extending inwardly from tubular arm member 42. The spring is thus normally or initially under a compressive bias force, and will not compress further until after the bias force has been applied and then exceeded. Until that time, the spring behaves as a rigid link in compression. The spring 62 is preferably relatively stiff (high spring rate), but this can be varied to suit individual applications.

The interengaging faces of the pads 45 and the adjacent underlying areas of the arm tube 42 are faced off flat and parallel, and turn freely on one another to permit proper relative angular movement of the arm tube 42 or on the confronting faces of the pads.

The motor 24 for swinging the boom has been assumed to be an electrical motor, though a hydraulic motor may be used, and it may have conventional manually operable direction controlling switching means, and limit switches for stopping the motor at the end limits of the full 90° swing of the boom. Electrical circuitry for accomplishing these purposes is well within the skill of the art, and need not be disclosed herein. In addition, however, the circuitry has switches for stopping the drive motor, or means for stopping the drive of the boom by the drive motor, in response to development of forces or torques of predetermined magnitudes when the boom in its travel meets an obstruction. Such circuitry is also within the skill of the art, and this disclosure therefore may be confined to the actuating means for such circuitry. Thus, as here shown, the underside of the aforementioned rotational base 30 carries sensors in the form, in this embodiment, of two conventional switches S1 and S2 (FIG. 2), with actuating plungers or arms as indicated conventionally at P1 and P2. Between the actuating plungers of these switches is the arm 70 of an actuating lever 71, pivotally mounted on a fulcrum pin 72 set into the underside of the aforementioned radial protuberance 34 of base 30. The other arm 74 of the lever 71 is bifurcated, as at 75, to receive an actuating pin 76 depending from an actuating arm 77 affixed to the lower portion of the end wall 51 of the aforementioned housing sleeve or plunger 50, as by screws or rivets, or by fabricating the arm as an integral part of the wall 51. The arm 77 will thus be seen to swing with telescoping arms 42 and 43 about pivotally anchored stem 66.

Before proceeding with a description of operation, it should be noted that the extremity of sleeve 50 terminates short of the flange 63 in the unactuated position of FIGS. 3 and 4, allowing for telescoping together of the sleeves 50 and 42 to a necessary extent as will presently appear.

Returning now to a consideration of the motor 24 and its planetary drive of the hollow stanchion 10, it can be seen from FIG. 1 that when the motor, fixed to the stanchion 10, is driven, it rotates the sun gear 26, while the planet gears 27 on the "cage" 29 and base 30 remain normally stationary as regards bodily orbital travel, because the two arm members 38 and 42 are being held in linear alignment, and arm member 42 is anchored at 67, 68. However, the planet gears 27 turn on their axes on the then stationary cage 29 and base 30, and through gear 28, slowly rotate the tubular boom sanchion 10 on its axis. Assume that the motor is provided with conventional control circuitry such that it can be switched to rotate in either direction, and assume further that it has been switched so as to drive the tubular boom stanchion 10 and the boom 18 in a clockwise direction of rotation (looking down from above). Under this condition, the "in-swinging" boom moves against a small opposing force or torque owing simply to working resistance of the parts. This working resistance is opposed and equalized, during normal running, by a reactive lateral (clockwise) reactive force exerted by the floor anchorage at 67, 68 against the double-arm, articulated lever system comprised of the arms 38 and 42, 43, pivoted together at 46, but stiffened in its linearly aligned position of FIGS. 1-4 by the pre-compressed or biased compression spring 62. It will be understood that the compressive bias of spring 62 is sufficient that it does not yield under this condition, and functions instead as a stiff link holding the roller in the bottom of the V-groove, and thus preventing pivotal action at pivot 46.

Assume now that the boom strikes an obstruction in its postulated clockwise rotation (rotational from an outstretched pickup position toward a position back inside the helicopter). Balancing the large torque added by the effort of the motor driven boom to move against the obstruction is a correspondingly increased lateral reactive force exerted at the anchorage 67, 68 (downward in FIG. 5); and the counterclockwise torque at the base or platform 30, rotatably mounted relative to its axial anchorage at 14, 15 (FIG, 2), increases accordingly. With this increase, the torque on the base 30 is large relative to that owing merely to normal unobstructed working effort.

The increase in counterclockwise torque on the base 30 and radial arm 38 owing to engagement of the inswinging boom with the assumed obstruction is now sufficient to produce the following action:

A large counterclockwise torque (clockwise looking upward from below as in FIG. 2) acts at the vertical pivot pin 46. This torque is sufficient to overcome the arm stiffening effect of the biased or pre-compressed compression spring, and pivotal action between tubular arm 38 and telescoping arm members 42 and 43 suddenly occurs at pivot 46, taking the parts to the position of FIG. 5. Member 42 moves a short distance outward of the member 43 to accommodate this action. The nose roller 54 on the end of spring housing tube 50 is cammed in this action by one side of the V-notch 60 to move the parts to the position shown in FIG. 5.

The overcoming of the pre-compressed spring, and the resulting angular "break" of the arm parts at the pivot 46, is thus the torque limiting feature of the device. The use of the two telescoping arm tubes 42 and 43 readily accommodates the angular "break". However, the angular break spoken of is quite small, so that the initial linear distance from the center of platform 30 through the axis of pin 46 to the center of the anchor stem 66, prior to the break, is only slightly exceeded by the distance from the center of the platform 30 to the center of the pin 46, and thence on to the center of the stem 66, following the break. Ordinary working tolerances or clearances can make up for this differential, and hence, while the preferred form of the device has the tubes 42 and 43 in a telescopic arrangement, they can actually, in a simplified form, be one integral piece.

When the aforementioned "break" of the arm parts occurs, the arm 77 swings clockwise on the anchorage pivot at 67, 68. The arm 38 simultaneously swings counterclockwise, along with a small counterclockwise rotation of platform 30, and the lever 71 engaged by arm 77 moves counterclockwise on its pivot pin 72, whereby the lever arm 70 swings so as to actuate the plunger P1 of switch S1. Looking at FIG. 2, which is a view looking upwards from below, and therefore with all pivot directions reversed from those in the aspect of FIG. 5, this means that the arm 77 would appear to swing counterclockwise, and so rock the bifurcated end of lever 71 clockwise on its pivot 72, whereby to actuate the switch S1. Through suitable circuitry, not shown herein because of obviousness to those skilled in the art, this actuation of switch S1 stops the motor 24, or the drive of the boom by the motor, as by de-clutching, and the inward swing of the boom is interrupted. Of course, if the boom meets an obstruction while swinging outward rather than inward relative to the obstruction, the system works similarly, but in the reverse direction, so as to interrupt the outward swing of the boom. The arrested boom can be backed away from the obstruction by driving the motor in the reverse direction, again using obvious manually controlled circuitry.

It should be noted that the angles of the two sides of the V-cam are not necessarily the same. By making these of different angles, the spring bias forces are in effect adjusted, offering the optional ability to accomplish interrupt actuations at different torque magnitudes in the two directions of travel of the boom.

Figure 2:
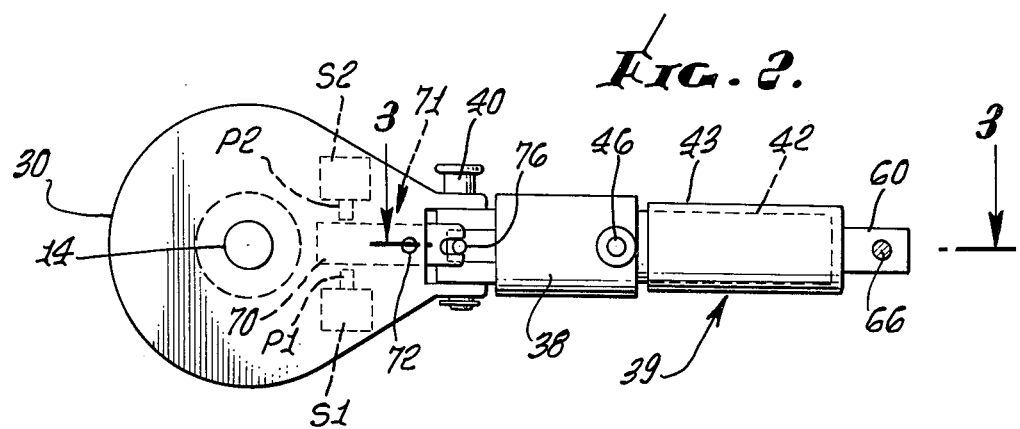
FIG. 2 is a bottom plan view taken on the line 2—2 of FIG. 1.

FIGS. 8 and 9 show diagrammatically a modification which embodies an equivalent reversal of parts as compared with the embodiment of FIGS. 1-6. Parts are the same as in the original embodiment, but reversals will be noted. The input arm I in this case has a reduced extremity 85 forming a seating shoulder for one end of a pre-compressed compression spring 86. A reaction arm R composed of two telescopic arm members T1 and T2 is again provided, one member T1 (the outer) pivotally anchored at 87 and the second T2 (the inner) pivotally connected by transverse pivot pin 88 to the input arm I, much as in the embodiment of FIGS. 1-6. A plunger 89, telescopically slidable in a longitudinal bore in the input arm extremity 85, has a shoulder at 90 supporting the opposite end of pre-compressed compression spring 86. The plunger 89 extends on to a nose 91 seated in the bottom of V-cam 92 which is fixed in or on the inner arm member T2 of the reaction arm R. Arm I has a hub or platform 93, rotatable on fixed anchorage 94 on the longitudinal axis of arm I. The tubular arm T2 has, at the bottom, and at its extremity nearest the platform 93, an extension T2' with a pin and slot connection at 95 with a lever 96 pivoted at 97 on the underside of the platform 93. The lever 96 is a directionally discriminatory actuator arm, and will be seen to actuate either of two sensors such as shown in FIG. 2, depending upon the direction of pivotal action. The operation of this embodiment will be obvious from the foregoing description, and will be seen to be fully equivalent to the first described embodiment.

FIG. 7 shows diagrammatically an elemental form of the invention. As shown, an arm 100 projects from a relatively fixed member 102. The latter may be stationary in one form of the invention, or may be rotated on the axis A.

The arm 100, near member 102, is pivotally connected, as at 103, to a second arm 104, normally parallel with arm 100. Arm 104 has, beyond the end of arm 100, a V-cam 106, in the bottom of which is normally engaged the nose roller 107 of plunger 108 telescopically received in a bore 109 in arm 100. Between the plunger and the bottom of bore 109 is a precompressed compression spring 112.

Assume application of downward force F to arm 104 at 114. This force will produce no downward deflection of arm 104, until the precompression force of spring 112 is exceeded by a leftward component of force applied against the plunger by the upper side of the V-cam 106. The cam then forces the plunger to the left, the spring 112 compresses, and the arm 104 pivots downwardly, actuating switch designated at SW1. Upon application of an upward force F', at 114', a similar action occurs, but upwards in direction, closing switch SW2. The device thus actuates one or the other of these switches, depending upon an application of one or the other of forces F and F–, of a predetermined magnitude capable of overcoming the precompression of the spring. A similar performance takes place in the case wherein the member 102 and arm 100 are slowly power rotated on the axis A, and the forces at F or F' arise from engagement of the arm 104 against an obstruction.

What is claimed is:

1. In a mechanical direction discriminating sensor: an input arm pivoted on a first relatively fixed pivot axis and adapted to be torqued in either direction about said axis,
   a reaction arm comprised of two telescopically related arm members, one pivoted about a second relatively fixed axis, spaced from and parallel to that of said input arm, the second being pivotally connected to said input arm for pivotal movement about an axis spaced from and parallel to said second relatively fixed pivot axis,
   a V-cam on at least one of said input arm and said second arm member, facing longitudinally therealong,
   a plunger engaging in said V-cam, telescopically related to the respective one of said second of said telescopically related arm members of said reaction arm, and said input arm,
   a pre-compressed compression spring means acting longitudinally of said input arm between said plunger and said input arm, said compression spring means having sufficient pre-compression to withstand a compressive force of a predetermined limited magnitude without longitudinal contraction, and thereby stiffen said input and reaction arms against angular break at the pivot connection therebetween, but to contract in response to compressive force of a predetermined larger magnitude owing to torque in either direction on said input arm, whereby said angular break of said input and reaction arms occurs at said pivot connection therebetween, in opposite directions depending upon the direction of said torque, and
   sensor operating means on a pivoting portion of said reaction arm discriminatory by its direction of movement between the directions of said angular break.

2. The combination according to claim 1, wherein said V-cam is on said input arm, and said plunger engaging in said V-cam is telescopically related to said second arm member of said reaction arm.

3. The combination according to claim 2, wherein said switch operating means comprises an actuating arm fixed relative to said plunger, and including
   a lever pivotally mounted on said input arm, with a pin and slot connection between the extremity of one arm thereof and said last-mentioned actuating arm, and sensor means mounted on said input arm on opposite sides of the other arm of said lever.

4. The combination according to claim 2, wherein said input arm has a tubular outer end portion,
   said reaction arm embodying an outer tubular arm member and an inner tubular arm member telescopically received therein,
   said reaction arm member embodying telescoping tubular members, the outer of which has said pivot connection to said second fixed axis, and the inner of which has said pivotal connection with said tubular outer portion of said input arm, and extends inwardly, with clearance, into said input arm past said pivotal connection,
   said plunger embodying a tubular housing and end seat for one end of said pre-compressed compression spring means, and said inner tubular arm member having an abutment for the other end of said compression spring means.

5. The combination according to claim 1, wherein said V-cam is on said second arm member of said reaction arm, and said plunger is telescopically related to said input arm.

6. In a mechanical direction discriminating sensor:
   an input arm pivoted on a first relatively fixed pivot axis and adapted to be torqued in either direction about said axis,
   a reaction arm pivoted at one end about a second relatively fixed axis, spaced from and parallel to that of said input arm, and pivotally connected to said input arm for pivotal movement about an axis spaced from and parallel to said second relatively fixed pivot axis,
   a V-cam on at least one of said input arm and said reaction arm, facing longitudinally therealong,
   a plunger engaging in said V-cam, telescopically related to the respective one of said reaction arm, and said input arm,
   a pre-compressed compression spring means acting longitudinally of said input arm between said plunger and said input arm, said compression spring means having sufficient pre-compression to withstand a compressive force of a predetermined limited magnitude without longitudinal contraction, and thereby stiffen said input and reaction arms against angular break at the pivot connection therebetween, but to contract in response to compressive force of a predetermined large magnitude owing to torque in either direction on said input arm, whereby said angular break of said input and reaction arms occurs at said pivot connection therebetween, in opposite directions depending upon the direction of said torque, and
   sensor operating means on a pivoting portion of said reaction arm discriminatory by its direction of movement between the directions of said angular break.

* * * * *